US008832196B2

(12) United States Patent
Yu et al.

(10) Patent No.: US 8,832,196 B2
(45) Date of Patent: Sep. 9, 2014

(54) SYSTEM AND METHOD FOR INFORMATION MANAGEMENT

(71) Applicant: Gilkron Limited, Hong Kong (HK)

(72) Inventors: Ronald Ker-Wei Yu, Hong Kong (HK); Patrick Michael Dransfield, Hong Kong (HK); Stefan Michael Gannon, Hong Kong (HK); Timothy Paul Gilkison, Hong Kong (HK)

(73) Assignee: Gilkron Limited, Hong Kong (HK)

( * ) Notice: Subject to any disclaimer, the term of this patent is extended or adjusted under 35 U.S.C. 154(b) by 64 days.

(21) Appl. No.: 13/671,579

(22) Filed: Nov. 8, 2012

(65) Prior Publication Data
US 2013/0204928 A1 Aug. 8, 2013

(51) Int. Cl.
*G06F 15/16* (2006.01)
(52) U.S. Cl.
USPC ............ 709/204; 709/203; 709/218; 709/228
(58) Field of Classification Search
CPC ...... H04L 67/34; H04L 67/2823; H04L 67/20
USPC .................................. 709/204, 203, 218, 228
See application file for complete search history.

(56) References Cited

U.S. PATENT DOCUMENTS

| 6,182,038 | B1 * | 1/2001 | Balakrishnan et al. ........ 704/250 |
| 2001/0024909 | A1 * | 9/2001 | Wakata et al. ................ 439/680 |
| 2006/0248480 | A1 * | 11/2006 | Faraday et al. ............... 715/866 |
| 2008/0091846 | A1 * | 4/2008 | Dang ........................... 709/246 |
| 2010/0058169 | A1 * | 3/2010 | Demant et al. ................ 715/234 |

\* cited by examiner

*Primary Examiner* — Nicholas Taylor

(57) ABSTRACT

A system for information management includes a remotely accessible server configured for receiving a request from a user for a service provided by at least one designated service provider and for receiving a response from the at least one designated service provider; means controlled by the server for providing a first user interface that allows the user to download a preset template, to modify the template with user specific content, and to select the at least one designated service provider with a predetermined set of criteria; means controlled by the server for generating a virtual content module associated with the user that contains the modified template; means controlled by the server for transmitting a first notification message to the at least one designated service provider.

20 Claims, 22 Drawing Sheets

*600*

*601*

Our Question is:

Table of Contents

ASK LIVSs Request for Pitch/Information and Response

Confidential

```
☐    -   All
☐    └── + Our Panel IP Firms
☐    └── - Asia
☐         └── + China
☐         └── + Hong Kong
☐         └── + India
☐         └── + Indonesia
☐         └── + Japan
☐         └── + Malaysia
☐         └── + Philippines
☐         └── + Singapore
☐         └── + South Korea
☐         └── + Taiwan
☐         └── + Thailand
☐         └── + Vietnam
☐    └── + Australia Pacific
```

*901* points to the checkbox column.

- All
  - + Our Panel IP Firms
  - - Asia
    - + China
    - + Hong Kong
    - + India
    - + Indonesia
    - + Japan
    - + Malaysia
    - + Philippines
    - - Singapore
      - + Alternate Investment Funds
      - + Antitrust - Competition
      - + Aviation
      - + Banking & Finance
      - + Capital Markets
      - + Corporate and M&A
      - + Employment
      - + Energy
      - + Intellectual Property
      - + Life Sciences
      - + Litigation
      - + Maritime
      - + Projects & Project Finance
      - + Real Estate
      - + Restructuring & Insolvency
      - + Taxation
      - + Telecom, Media & Technology

☐   − All
☐       + Our Panel IP Firms
☐       − Asia
☐           + China
☐           + Hong Kong
☐           + India
☐           + Indonesia
☐           + Japan
☐           + Malaysia
☐           + Philippines
☐           − Singapore
☐               + Alternate Investment Funds
☐               + Antitrust − Competition    *1101*
☐               + Aviation
☐               − Banking & Finance
☐                   − XXX & YYY
☐               + Capital Markets
☐               + Corporate and M&A
☐               + Employment
☐               + Energy
☐               + Intellectual Property
☐               + Life Sciences
☐               + Litigation
☐               + Maritime
☐               + Projects & Project Finance
☐               + Real Estate
☐               + Restructuring & Insolvency
☐               + Taxation
☐               + Telecom, Media & Technology

SIX STEPS TO ASK LIVSS · 1 · 2 · 3 · 4· 5 · 6
Ask Livss - Details of your enquiry Note: If your enquiry is more than one regular paragraph long please use the space below as an introduction only and attach full details in MS Word or .pdf documents ('Section B' below)

A. Our question/request is:

*1201* — Please see enclosed

*1202*

B. I would like to attach these supplemental files: C:\Users\User\Desktop\04 Browse

*1203* — C. Our preferred fee arrangements are:
○ Our standard arrangement
○ Hourly
○ Fixed
○ Blended (specify below:

*1204*

D. I would like to have a response submitted by: 14 April 2010

Country/Time Zone: (GMT + 08:00) Asia / Hong Kong: Hong Kong Time

Please note the client response deadline below and treat with due PRIORITY where necessary.

ASK LIVSS ID: ASKLIVSS000012982      *1601*                     *1602*

Identity:    Personal Name      COUNSEL In House

Email              Ron.yu@xxxxx.com

Company Name       xxxxxxx

*1603*       Job Title          In House Counsel

Ask Livss – Selecting your area of interest
I would like to submit a question / request a pitch in the following area(s):
Intellectual Property ASK Livss: Details of your enquiry       *1604*

A.  Our question/request is:       *1605*

C.  Our preferred fee arrangements are:       *1606*
Other
C.  I would like to have a response submitted by:
Dates to be confirmed Ask Livss – Selecting your approved recipients B. Only the above persons should have access to the submissions/responses:
Nil

XXX LAW FIRM reply: ASK LIVSs ASKLIVSS000012991
Ron.yu@xxxxx.com
Sent: Thu 3/2/2010 12:21 PM
To: ron.yu@xxxxxx.com
Cc: ron.yu@xxxxx.com Message: Open_ask_livss.jpg (34 KB)

Dear XXX LAW FIRM

You may now review ASK LIVSs request, No: ASKLIVSS000012991.

To access the ASK LIVSs request, follow the instructions included in this message.

Thank you for your attention.

Sincerely,

The LIVSs Support Team

---

This message is intended only for use of the addressee and may contain information that is privileged and confidential. If you are not the intended recipient, you are hereby notified that any use or dissemination of this communication is strictly prohibited. If you have received this communication in error, please notify us immediately by reply and delete this message from your system.

Response Received for ASK LIVSs: ASKLIVSS000012991
Ron.yu@xxxxx.com
Sent: Thu 4/1/2010 12:33 PM
To: ron.yu@xxxxxx.com

2001

User LAW FIRM XXX has submitted a response to: ASKLIVSS000012991

On Apr 1, 2010 12:31 PM

---

This message is intended only for use of the addressee and may contain information that is privileged and confidential. If you are not the intended recipient, you are hereby notified that any use or dissemination of this communication is strictly prohibited. If you have received this communication in error, please notify us immediately by reply and delete this message from your system.

- Home Page
- Catalogs
- Ask LIVSs
- Review

- Help
- User Profile
- Contact Us
- Logout

Response Submitted Area

2102

Ask Livss
ASKLIVSS0000013442.pdf       IN HOUSE Counsel 2 (COMPANY_2)   May 27, 2010
052710 Demonstration Ask Livss Template.docx   IN HOUSE Counsel 2 (COMPANY_2)   May 27, 2010

2103

From submitted response
041010 Sales v Marketing.docx    LAW FIRM Jean Paul Giga (FLOPSWEAT)   Apr 1, 2010
Our reply 2104  2105

Question (1)

ASK LIVSs Response number:

Fill in the blank below

Question (2)

Name of responding firm or service provider

Fill in the blank below

Question (3)

Identification of facts
 1 = Poor  5 = Excellent
1  2  3  4  5
○ ○ ○ ○ ○

Question (4)

Identification of issues
 1 = Poor  5 = Excellent
1  2  3  4  5
○ ○ ○ ○ ○

Question (5)

Identification of issues
 1 = Poor  5 = Excellent
1  2  3  4  5
○ ○ ○ ○ ○

Question (6)

Recommendations
 1 = Poor  5 = Excellent

|  | Practicality or Usefulness | Relevance | Creativity |
|---|---|---|---|
|  | 1  2  3  4  5 | 1  2  3  4  5 | 1  2  3  4  5 |
| 6.1 Quality of Recommendations | ○ ○ ○ ○ ○ | ○ ○ ○ ○ ○ | ○ ○ ○ ○ ○ |
| 6.2 Identification of additional considerations | ○ ○ ○ ○ ○ | ○ ○ ○ ○ ○ | ○ ○ ○ ○ ○ |

Fig. 22

SYSTEM AND METHOD FOR INFORMATION MANAGEMENT

CROSS-REFERENCE TO RELATED APPLICATIONS

This application claims the benefit of Hong Kong short term patent application No. 12100988.0 filed on Feb. 3, 2012. All of the applications cited above are incorporated by reference in their entirety.

FIELD OF THE PATENT APPLICATION

The present patent application generally relates to information management technologies and more specifically to a system and a method for information management that securely enable exchange of information between requesters of intellectually oriented services, such as legal services, and designated recipients who prepare responses to the requests made by the requestors, and evaluation of the responses.

BACKGROUND

While online procurement systems have existed for many years, these systems are geared towards the sourcing of physical components or goods, not the provision of intellectually oriented services.

Manufacturing and trade oriented procurement systems cannot be successfully adapted to the sourcing of intellectual services because potential suppliers are frequently judged on easily quantifiable criteria such as cost or delivery dates, whereas potential providers of intellectual services are often assessed qualitatively, typically without a consistent analysis framework.

As a result, consistent qualitative assessments of such intellectual services or competing bids to provide intellectual services are difficult to carry out on online systems or even through an exchange of online communications, resulting in the need for, among other things, phone calls between those seeking to hire and those providing intellectual services to supplement the analysis.

Such phone calls can be both difficult and inconvenient if parties are located in different international time zones. In addition, many organizations lack an organized scheme for assessing the procurement of intellectual services, in part because of a lack of a consistent assessment framework. This also creates problems of potential perceived or actual corporate governance issues.

Despite the absence of a consistent analysis framework applicable across a range of intellectual services, a consistent analysis framework can in fact be created because most requests for intellectual services, i.e. "Requests for Information (RFI)" are created because the Requester has a need or a problem that requires a resolution. A Requester also may want to know if a DR (Designated Recipient) can provide a proper response to a request for information in a timely manner by specifying a deadline in the RFI.

When a DR receives a complex RFI the DR, to prepare a proper, high quality analysis, generally needs to identify relevant facts and issues and applicable principles, legislation, or formulae. A proper, high quality response to an RFI should contain an analysis that logically leads to and supports some premise or recommendations. The analysis, on some occasions, may include an identification of additional related issues. Such an analysis framework has never been applied in a commercial procurement scenario and it is desired to have the combination of such a framework and a suitable supporting back end mechanism that will disseminate an RFI to selected DRs, receive completed responses to the RFI and provide a mechanism to evaluate these responses, and also optionally allow Requesters to encrypt their RFIs to ensure the confidentiality of the communications.

SUMMARY

The present patent application is directed to a system for information management. In one aspect, the system for information management includes a remotely accessible server configured for receiving a request from a user for a service provided by at least one designated service provider and for receiving a response from the at least one designated service provider; means controlled by the server for providing a first user interface that allows the user to download a preset template, to modify the template with user specific content, and to select the at least one designated service provider with a predetermined set of criteria; means controlled by the server for generating a virtual content module associated with the user that contains the modified template; means controlled by the server for transmitting a first notification message to the at least one designated service provider; means controlled by the server for providing a second user interface that allows the at least one designated service provider to update the virtual content module by further modifying the template; means controlled by the server for transmitting a second notification message to the user; and means controlled by the server for providing a third user interface that allows the user or a reviewer to review the further modified template.

The system may further include means controlled by the server for validating identity of the user and identify of the at least one designated service provider. The system may further include means controlled by the server for encrypting the template after the template is modified with user specific content. The criteria for the user to select the at least one designated service provider may include jurisdictions or practice areas.

The system may further include means controlled by the server for providing an additional user interface that allows the user to input additional request information. The means for generating the virtual content module may be configured to incorporate the additional request information into the virtual content module. The system may further include means controlled by the server for generating a non-modifiable cover sheet. The cover sheet may contain a summary of the additional request information. The additional request information may include a question from the user, a preference on fee arrangement of the user, or a deadline specified by the user.

The system may further include means controlled by the server for providing an additional user interface that allows the user or the reviewer to input an evaluation on the response of the at least one designated service provider.

In another aspect, the system for information management includes a server configured for receiving a request from a user for a service provided by at least one designated service provider; means controlled by the server for providing a first user interface that allows the user to download a preset template, to modify the template with user specific content, and to select the at least one designated service provider with a predetermined set of criteria; means controlled by the server for generating a virtual content module that contains the modified template; means controlled by the server for transmitting a first notification message to the at least one designated service provider; means controlled by the server for providing a second user interface that allows the at least one designated service provider to update the virtual content module by further modifying the template; means controlled by the server for transmitting a second notification message to the user; and means controlled by the server for providing a third user interface that allows the user or a reviewer to review the further modified template. The server is connected to the Internet.

The server may be connected to the Internet through an Intranet and a firewall, and may be accessible to the user or the reviewer through the Intranet. The system may further include means controlled by the server for providing an additional user interface that allows the user to input additional request information. The means for generating the virtual content module may be configured to incorporate the additional request information into the virtual content module. The system may further include means controlled by the server for generating a non-modifiable cover sheet. The cover sheet may contain a summary of the additional request information.

In yet another aspect, the present patent application provides a method for information management. The method includes providing a first user interface that allows a user to download a preset template, to modify the template with user specific content, and to select at least one designated service provider with a predetermined set of criteria; generating a virtual content module associated with the user that contains the modified template; transmitting a first notification message to the at least one designated service provider; providing a second user interface that allows the at least one designated service provider to update the virtual content module by further modifying the template as a response; transmitting a second notification message to the user; and providing a third user interface that allows the user or a reviewer to review the further modified template.

The method may further include validating identity of the user and identify of the at least one designated service provider. The method may further include encrypting the template after the template is modified with user specific content. The criteria for the user to select the at least one designated service provider may include jurisdictions or practice areas.

The method may further include providing an additional user interface that allows the user to input additional request information, and incorporating the additional request information into the virtual content module. The method may further include generating a non-modifiable cover sheet. The cover sheet may contain a summary of the additional request information. The additional request information may include a question from the user, a preference on fee arrangement of the user, or a deadline specified by the user.

The method may further include providing an additional user interface that allows the user or the reviewer to input an evaluation on the response of the at least one designated service provider.

BRIEF DESCRIPTION OF THE DRAWINGS

FIG. 6 shows a screen shot of the RT document the Requester will complete in using the system depicted in FIG. 1.

FIG. 7 shows a screen shot of the top section of a second application page that a Requester will view in using the system depicted in FIG. 1.

FIG. 9 shows a screen shot of a list of jurisdictions on a third application page that a Requester will view in using the system depicted in FIG. 1.

FIG. 10 shows a screen shot of an expanded list of jurisdictions and practice areas on the third application page that a Requester will view in using the system depicted in FIG. 1.

FIG. 11 shows a screen shot of the expanded list of jurisdictions, practice areas and DRs on the third application page that a Requester will view in using the system depicted in FIG. 1.

FIG. 12 shows a screen shot of a middle section of a fourth application page that a Requester will view in using the system depicted in FIG. 1.

FIG. 16 shows a screen shot of a non-modifiable cover sheet that a Requester or a DR will view in using the system depicted in FIG. 1.

FIG. 17 shows a screen shot of an email message that a DR will view in using the system depicted in FIG. 1.

FIG. 18 shows a screen shot of a first application page that a DR will view in using the system depicted in FIG. 1.

FIG. 20 shows a screen shot of an email message that a DR will view in using the system depicted in FIG. 1.

FIG. 21 shows a screen shot of a received RFI Modules that a Reviewer or Requester can view in using the system depicted in FIG. 1.

FIG. 22 shows a screen shot of an evaluation that a Reviewer or Requester can view and complete in using the system depicted in FIG. 1.

DETAILED DESCRIPTION

Reference will now be made in detail to a preferred embodiment of the system and the method for information management disclosed in the present patent application, examples of which are also provided in the following description. Exemplary embodiments of the system and the method for information management disclosed in the present patent application are described in detail, although it will be apparent to those skilled in the relevant art that some features that are not particularly important to an understanding of the system and the method for information management may not be shown for the sake of clarity.

Furthermore, it should be understood that the system and the method for information management disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
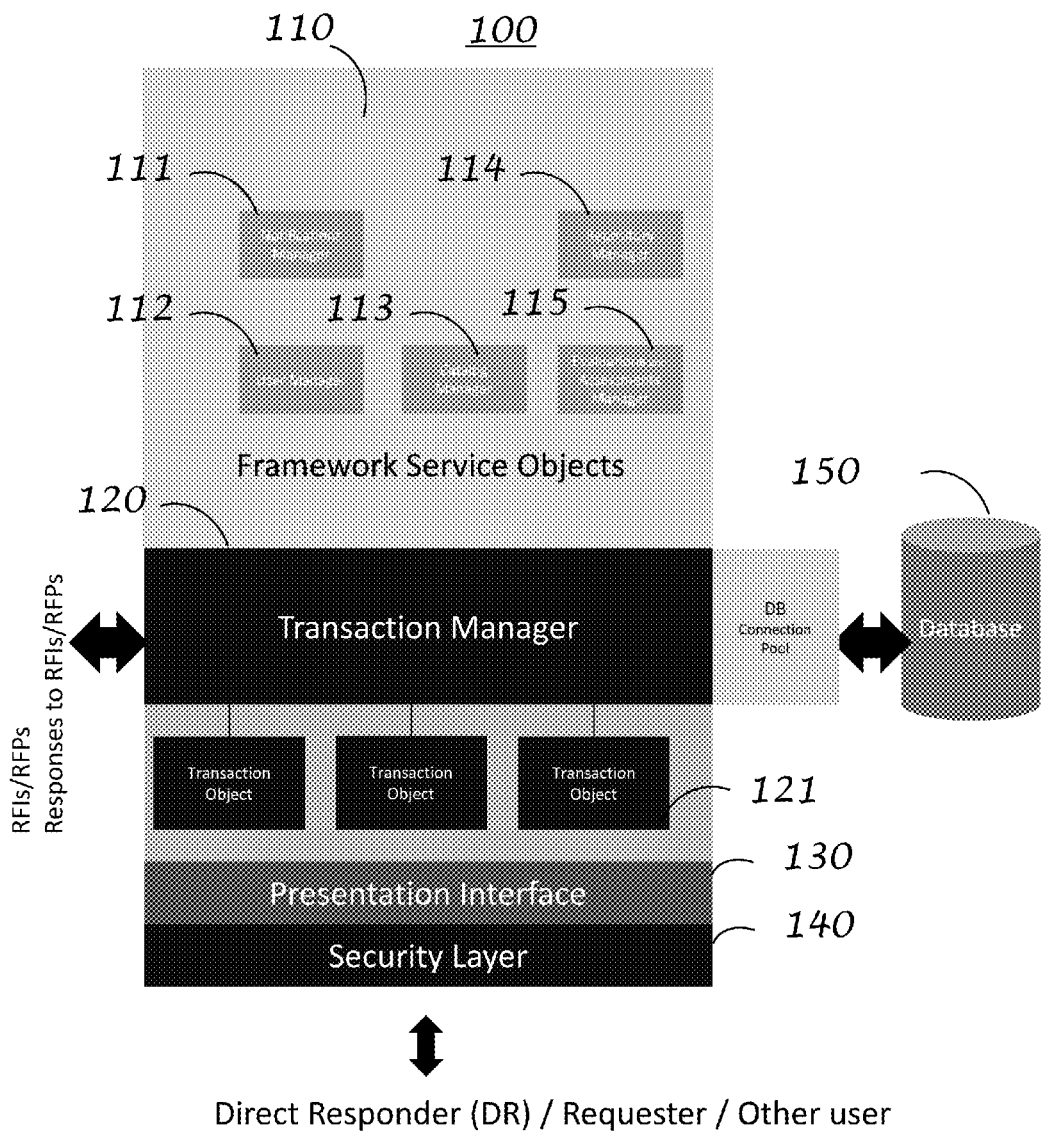
FIG. 1 is a diagram illustrating an overview of the system architecture of a system for information management according to an embodiment of the present patent application.

FIG. 1 is a diagram illustrating an overview of the system architecture of a system for information management according to an embodiment of the present patent application.

Referring to FIG. 1, the system 100 includes Framework Service Objects 110, a Transaction Manager Subsystem 120 that manages a plurality of Transaction Objects 121, a Presentation Interface subsystem 130, a Security Layer subsystem 140, and a Database subsystem 150. The framework service objects 110 further include a Notifications Manager subsystem 111, a User Manager subsystem 112, a Catalog Manager subsystem 113, a Repository Manager subsystem 114 and an Evaluations and Assessments Manager subsystem 115.

Figure 2:
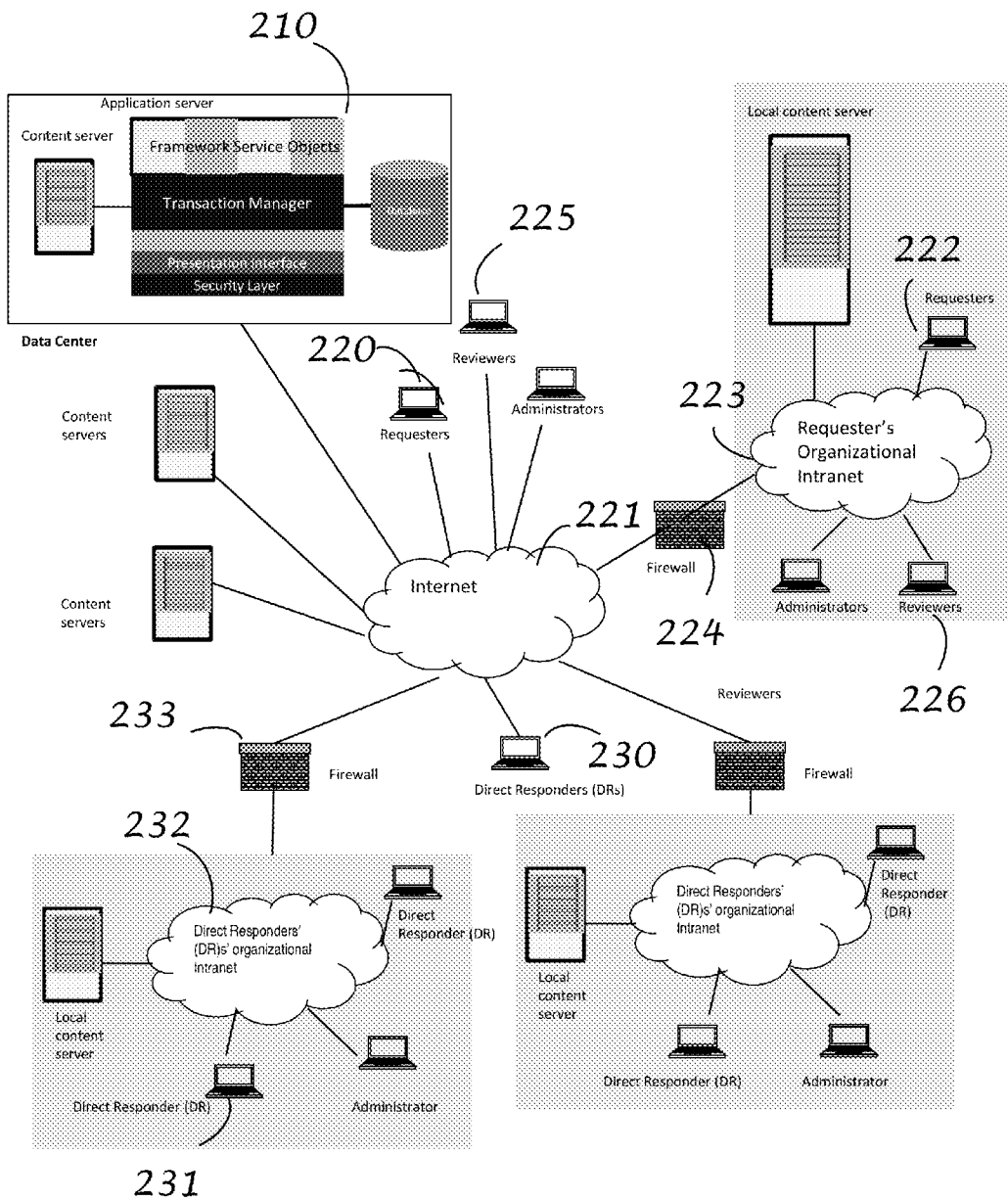
FIG. 2 is a diagram illustrating an implementation of the system depicted in FIG. 1.
Figure 3:
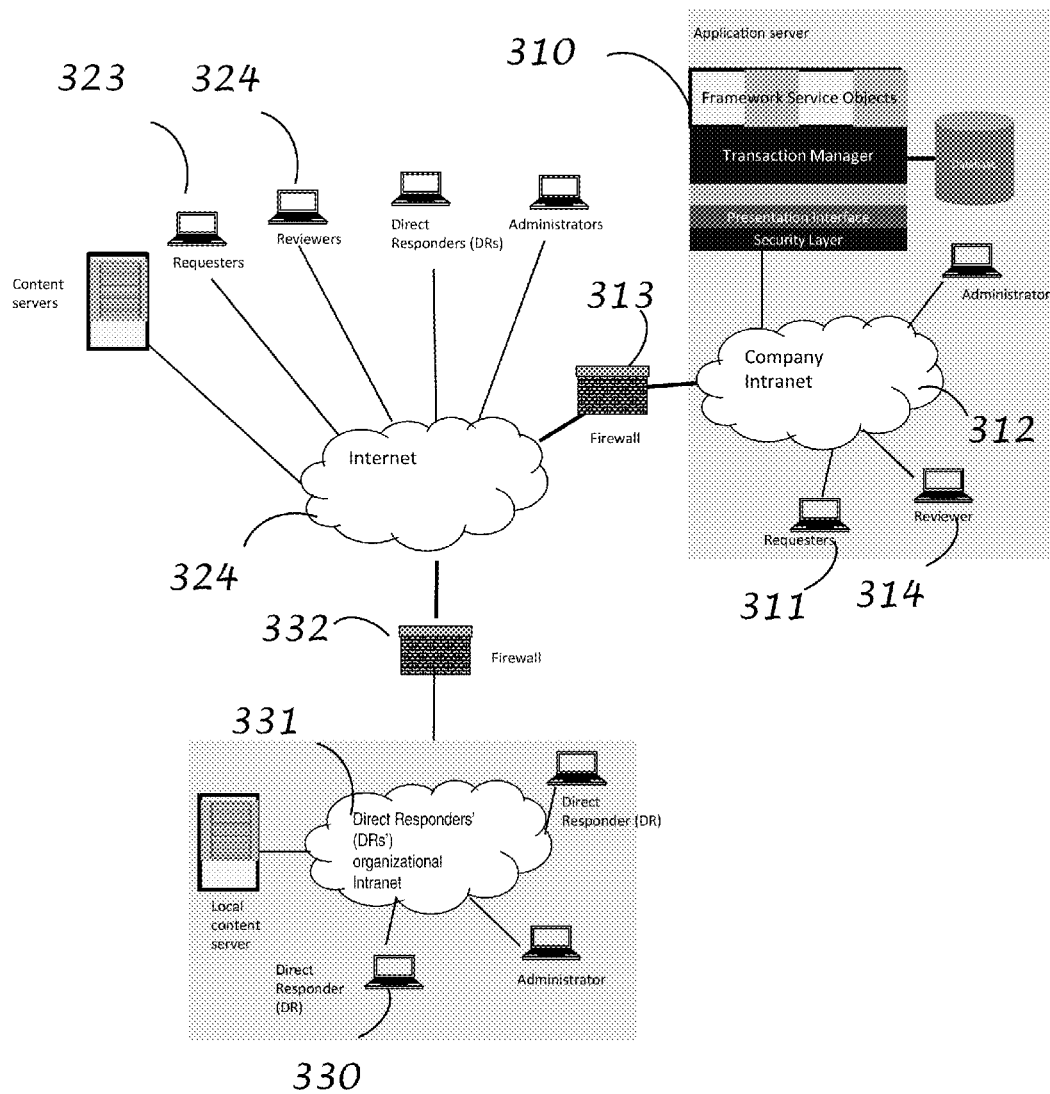
FIG. 3 is a diagram illustrating an alternative implementation of the system depicted in FIG. 1.

FIG. 2 is a diagram illustrating an implementation of the system depicted in FIG. 1. Referring to FIG. 2, users of the system 210 include a plurality of Requesters (220, 222), DRs (Designated Recipients) (230, 231) and Reviewers (225, 226). A Requester 220, a Reviewer 225, or a DR 230 can access the system 210 via the Internet 221. Alternatively a Requester 222, a Reviewer 226 or a DR 231 can access the system 210 by accessing the Internet 221 through an organizational network or Intranet 223 or 232 and a firewall 224 or 233. Alternatively, as in another embodiment as shown in FIG. 3, a Requester 311 or Reviewer 314 can access the system 310 through an organizational network or Intranet 312.

Figure 4:
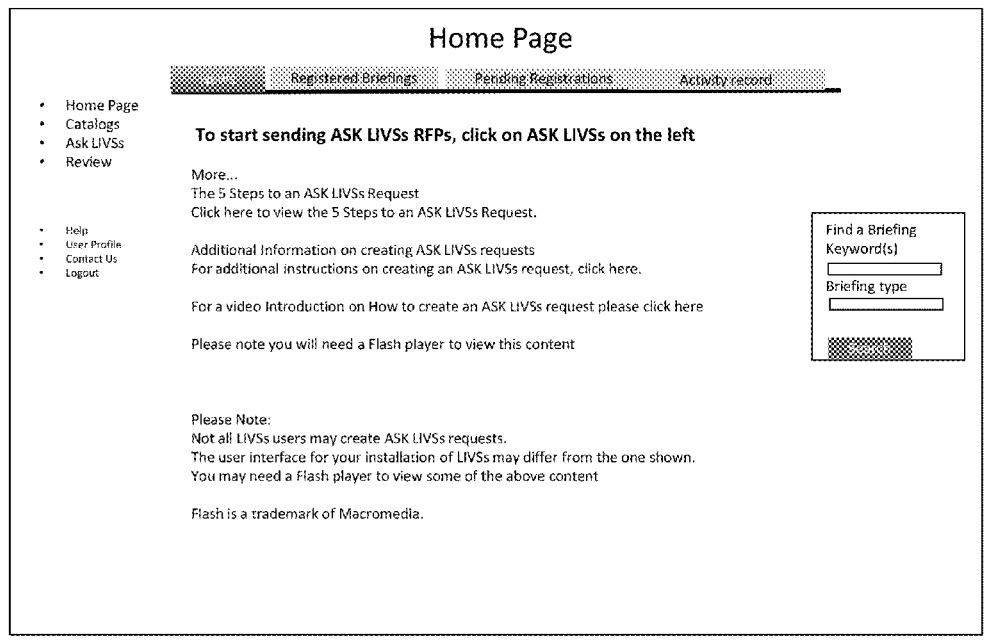
FIG. 4 shows a screen shot of a home page of the User Interface (UI) that a Requester will view in using the system depicted in FIG. 1.

Referring to FIG. 1, the Requester will log into the system 100 and will first pass through the Security Layer 140 which will determine whether the user has the right or authorization to access the system. If the Requester is allowed to access the system 100, the User Manager 112 will validate that the user is a Requester, determine the user's functional access privileges and the organization the user is associated with and then instruct the Presentation Interface 130 to present an appropriate User Interface 400, as illustrated in FIG. 4.

Referring to FIG. 1, a Requester starts the process by accessing the Request For Information (RFI) creation portion of the application. A Transaction Object 121 is created.

Figure 5:
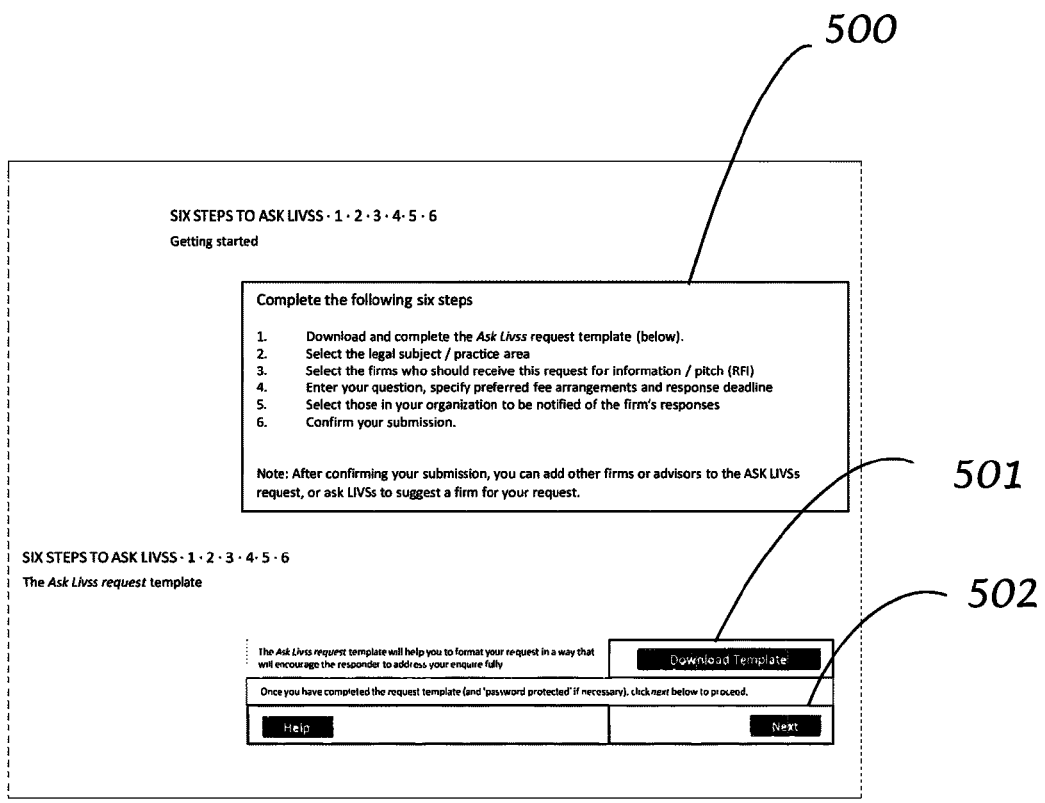
FIG. 5 shows a screen shot of a first application page that a Requester will view in using the system depicted in FIG. 1.
Figure 6:
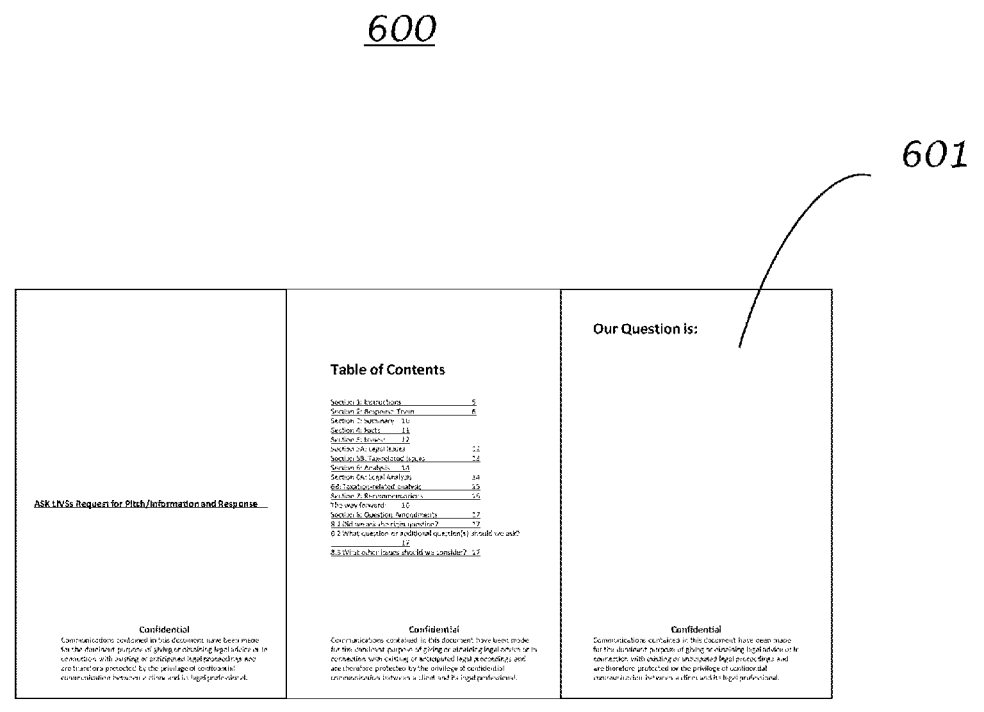

Referring to FIG. 5, the application presents the Requester with an overview of the overall process 500 so that the Requester knows what steps the Requester must perform. The Requester clicks the appropriate on-screen button 501 to initiate a download of the RT (Response Template) document file 600, as illustrated in FIG. 6. Referring to FIG. 1, the Repository Manager 114 locates and retrieves the RT file (RTF) from the Database 150.

The Requester then creates a new RFI by entering a question in the RTF along with other relevant information. The RTF serves three purposes and provides two key benefits. First, the RTF provides a location 601 as shown in FIG. 6 for a Requester to enter his or her questions. Second, the RTF provides a structure for the DR to provide a response in a clearly structured fashion entering the underlying premise or summary of recommendations; an identification of relevant facts, issues, jurisdictions and jurisdiction-related concerns, applicable principles, legislation, formulae; an analysis leading up to a plan of action or recommendations; and optionally, additional related matters. Third, should security be a concern, the Requester can encrypt the RTF.

The User Manager 112 retrieves the Requester's contact details and copies the information on the screen allowing the Requester to confirm his or her contact details 700.

Figure 8:
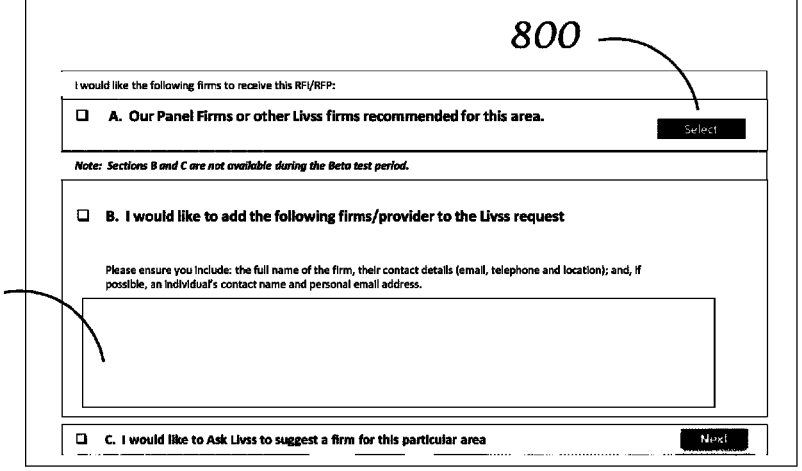
FIG. 8 shows a screen shot of the bottom section of a second application page that a Requester will view in using the system depicted in FIG. 1.

The Requester selects the DRs to whom the RFI will be sent by first clicking on a select button 800 as shown in FIG. 8.

Referring to FIGS. 9-11, the Requester selects the relevant jurisdiction 901 then the subject or practice area 1001 and then the desired DR 1101 from information retrieved from the User Manager 112. The selections are copied into the appropriate field 801 (in FIG. 8) of the UI for the Requester to review.

Figure 13:
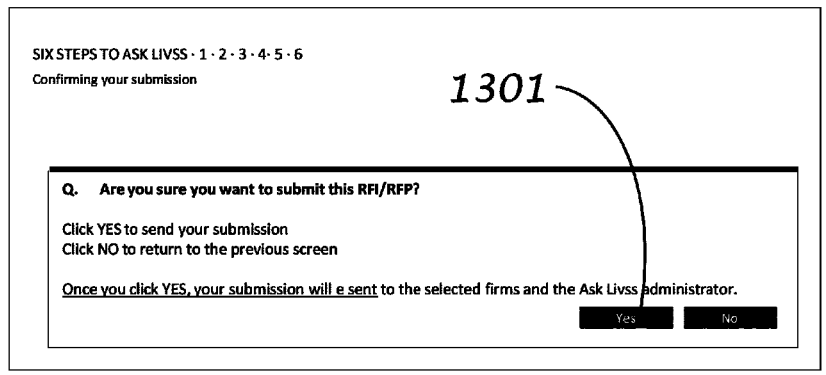
FIG. 13 shows a screen shot of a bottom section of the fourth application page that a Requester will view in using the system depicted in FIG. 1.

Referring to FIG. 12, the Requester can enter his questions or instructions 1201. The Requester may upload the RTF by clicking on the appropriate icon or link 1202, then selecting the file to upload. The Requester may specify his or her preferences regarding fee arrangements 1203. The Requester may specify a deadline for responses at 1204. The Requester may designate the Reviewers or the Reviewers may be pre-designated. Referring to FIG. 13, the Requester confirms that he or she wants to submit the RFI 1301.

Figure 14:
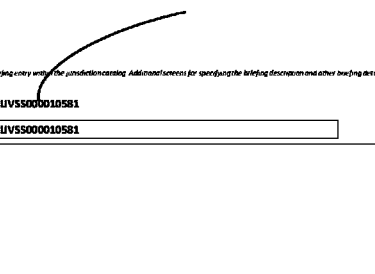
FIG. 14 shows a screen shot of the RFI module in the Catalog Manager in the system depicted in FIG. 1.

Referring to FIG. 14, the system generates a new RFI virtual content module ('VCM') 1400 in the Catalog Manager 113 with an identification number 1401. Based on the information provided by the Requester with regards to the selected DRs 1101, the Catalog Manager 113 will provide these DRs with the right to upload files to the new RFI VCM 1401.

Figure 15:
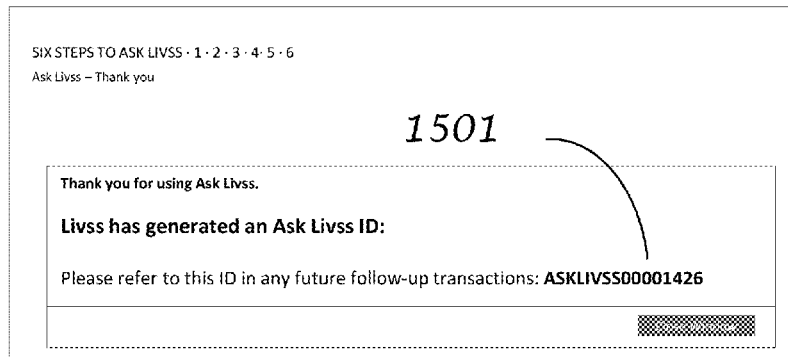
FIG. 15 shows a screen shot of a confirmation message the Requester will view in using the system depicted in FIG. 1.

Referring to FIG. 15, the system informs the Requester that a new module has been created 1500 and provides the identification number 1501 for reference purposes.

Figure 7:
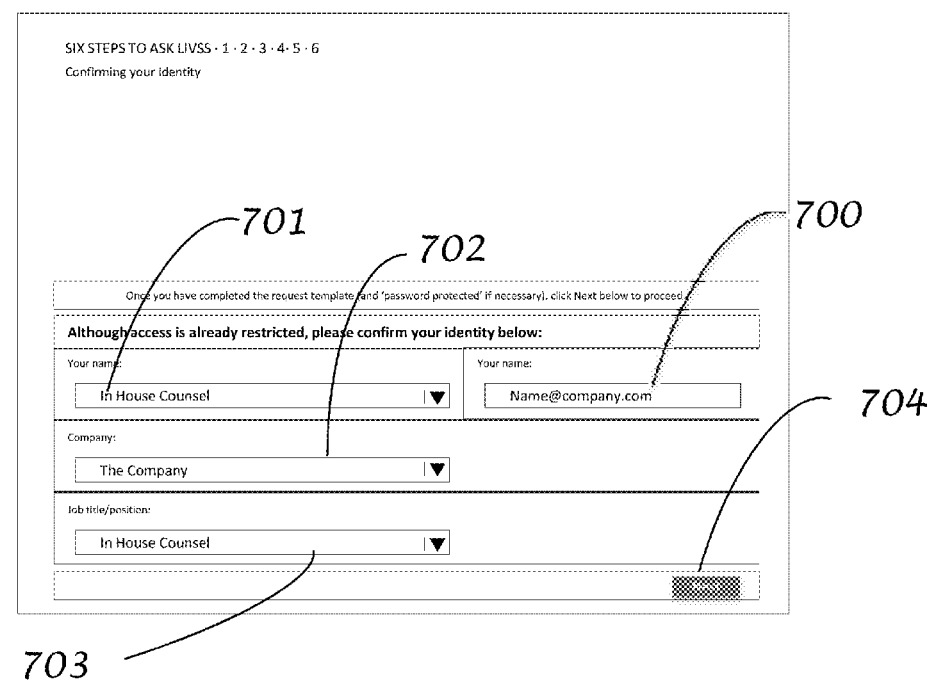

Referring to FIG. 16, the system automatically generates a non-modifiable cover sheet 1600 that provides information regarding the Requester including the Request's name 1601 and contact details 1602 retrieved earlier (700 in FIG. 7), the relevant practice area or subject 1603, questions or instructions 1604 if this information was provided earlier (1201 in FIG. 12), a deadline 1605 if this information was provided earlier (1204 in FIG. 12), preferences regarding fee arrangements 1606 based on information provided in an earlier step (1203 in FIG. 12).

Referring to FIG. 17, the system retrieves specific messages that had been predefined in the Notification Manager 111 and an electronic message 1700 that includes the new identification number 1701 is sent by the system's Notification Manager 111 to the DRs specified by the Requester.

Referring to FIG. 1 and FIG. 22, the Evaluations and Assessments Manager 115 associates a new evaluation 2200 with the new RFI module. The evaluation 2200 will be opened by the Requester or a Reviewer at a later stage, which will be described in more detail hereafter.

Referring to FIG. 1 and FIG. 2, the DR will log into the system and will first pass through the Security Layer 140 which will determine whether the DR has the right or authorization to access the system. A DR 230 can access the system 210 via the Internet 221. Alternatively a DR 231 can access the system 210 by accessing the Internet 221 through an organizational network or Intranet 232 and a firewall 233.

Figure 18:
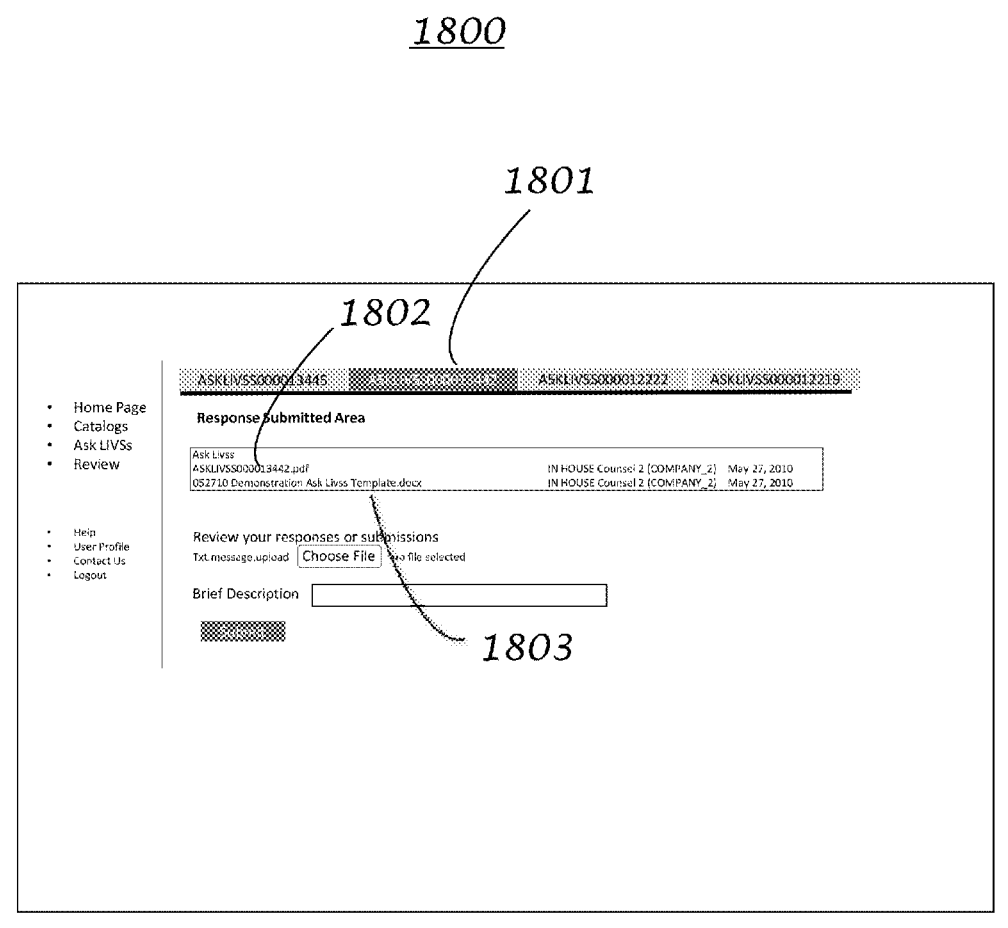

If the DR is allowed to access the application, the User Manager 112 will validate that the user is a DR, determine the user's functional access privileges and the organization the user is associated with and then instruct the Presentation Interface 130 to present the appropriate User Interface 1800 (as shown in FIG. 18).

Referring to FIG. 1, the Catalog Manager 114 will determine which RFI Modules the DR can access. A DR starts the response process by accessing the Response portion of the application. A transaction object 121 is created.

Referring to FIG. 18, the DR opens the new RFI module 1801 and reviews the enclosed documentation 1802 including the new request for information, which includes the coversheet 1600 and the RTF 600.

Figure 19:
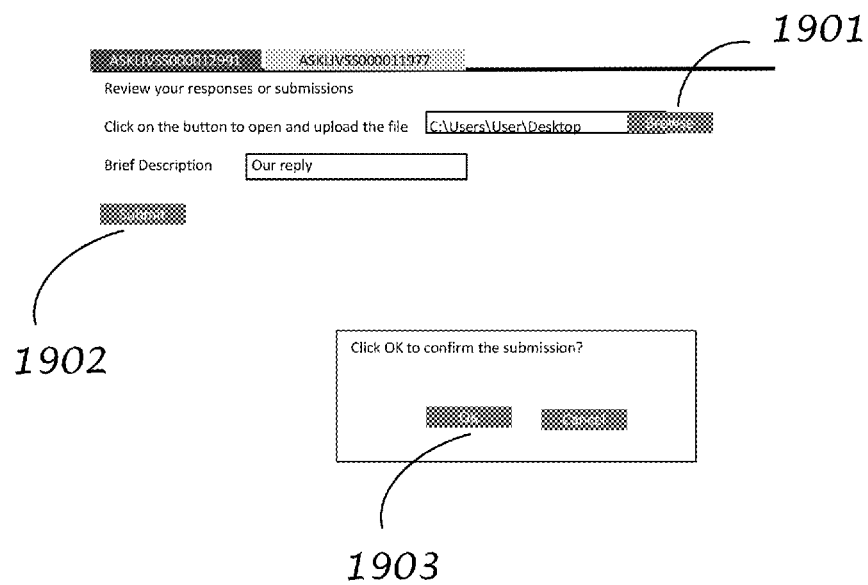
FIG. 19 shows a screen shot of a second application page and a confirmation box that a DR will interact with in using the system depicted in FIG. 1.

Referring to FIG. 19, the DR prepares a response by modifying and saving the RTF and uploading the document to the system 100 by clicking the browse button 1901, selecting the RTF, clicking the Submit button 1902 and then confirming submission button 1903.

Referring to FIG. 1, the RTF is uploaded to the Database 150 via the Repository Manager 114 and associated with the RFI VCM 1400 through the Catalog Manager 113. The system retrieves a specific notification message that had been predefined in the Notification Manager 111. The Notification Manager 111 then electronically transmits the notification message 2000 to the Requester showing that a response has been received along with the original identification number 2001 to enable the Requester to associate the response to the Requester's original RFI.

A Requester or Reviewer logs into the system and the Security Layer 140 will determine whether the Requester or Reviewer has the right to access the system. If the Requester or Reviewer is allowed to access the application, the User Manager 112 will validate that the user is a Reviewer or a Requester, determine the user's functional access privileges and the organization the user is associated with and then instruct the Presentation Interface 130 to present the appropriate User Interface 400.

The Catalog Manager 114 will determine which RFI VCM the Reviewer or Requester can access and presents these for review as illustrated by 2100 in FIG. 21. Referring to FIG. 21, the Requester or Reviewer locates the relevant file folder using the tracking number 2101. The Requester or Reviewer reviews the original request 2102 and then looks at a list of received responses 2104 noting the DR who provided the response and the date the response was received 2105. The Requester or Reviewer can then open and review the received response 2103.

An evaluation can then be selected from the Evaluations and Assessments Manager 115 and associated with the new RFI VCM. After reviewing the responses, the Requester or Reviewer opens the evaluation 2200 as illustrated in FIG. 22, which was previously associated by the Evaluations and Assessments Manager 115 with the RFI module, and evaluate the responses.

In the above embodiments, a system and a method are provided in which a Requester interacts with one or more non-collocated DRs by transmitting requests for information and receiving responses from DRs through the Internet. It is noted that the Response Template (RT) benefits the Requester by providing a structured framework from which the Requester can assess the ability of the DR to analyze the relevant fact pattern including the DR's ability to single out critical details, correctly identify critical matters, distinguish relevant from irrelevant particulars; the DR's capacity to correctly identify, where applicable, relevant issues, legislation, principles, formulae, jurisdiction or location specific matters, and other critical issues; the quality of the DR's analysis and whether it logically follows the prior identification of facts and issues; the DR's recommendations and whether they logically follow the prior analysis; the DR's ability to identify other relevant matters, concerns or considerations; and the DR's ability to conform to the Requester's request and respond in the format set out in the RT. The RT benefits the DR as the expected response structure has already been pre-structured so that the DR does not need to waste time struggling to create its own response structure. The embodiments enable the creation of an online procurement system for the sourcing of intellectually oriented services and the evaluation of rival bids for such services using a systematic and structured analysis framework.

While the present patent application has been shown and described with particular references to a number of embodiments thereof, it should be noted that various other changes or modifications may be made without departing from the scope of the present invention.

What is claimed is:

1. A system for information management comprising:
a remotely accessible server configured for receiving a request for information from a requester for a service provided by at least one designated intellectually oriented service provider and for receiving a response from the at least one designated intellectually oriented service provider;
means controlled by the server for providing a first user interface that allows the requester to download a preset template, to modify the template with requester specific content, and to select the at least one designated intellectually oriented service provider with a predetermined set of criteria;
means controlled by the server for generating a virtual content module associated with the requester that contains the modified template;
means controlled by the server for transmitting a first electronic notification message to the at least one designated intellectually oriented service provider;
means controlled by the server for providing a second user interface that allows the at least one designated intellectually oriented service provider to update the virtual content module by further modifying the template;
means controlled by the server for transmitting a second electronic notification message to the requester; and
means controlled by the server for providing a third user interface that allows the requester or a reviewer to review the further modified template.

2. The system of claim 1 further comprising means controlled by the server for validating identity of the requester and identify of the at least one designated intellectually oriented service provider.

3. The system of claim 1 further comprising means controlled by the server for encrypting the template after the template is modified with requester specific content.

4. The system of claim 1, wherein the criteria for the requester to select the at least one designated intellectually oriented service provider comprise jurisdictions or practice areas.

5. The system of claim 1 further comprising means controlled by the server for providing an additional user interface that allows the requester to input additional request information, wherein the means for generating the virtual content module is configured to incorporate the additional request information into the virtual content module.

6. The system of claim 5 further comprising means controlled by the server for generating a non-modifiable cover sheet, wherein the cover sheet contains a summary of the additional request information.

7. The system of claim 5, wherein the additional request information comprises a question from the requester, a preference on fee arrangement of the requester, or a deadline specified by the requester.

8. The system of claim 1 further comprising means controlled by the server for providing an additional user interface that allows the requester or the reviewer to input an evaluation on the response of the at least one designated intellectually oriented service provider.

9. A method for information management comprising:
providing a first user interface that allows a requester to download a preset template, to modify the template with requester specific content, and to select at least one designated intellectually oriented service provider with a predetermined set of criteria;
generating a virtual content module associated with the requester that contains the modified template;
transmitting a first electronic notification message to the at least one designated intellectually oriented service provider;
providing a second user interface that allows the at least one designated intellectually oriented service provider to update the virtual content module by further modifying the template as a response;
transmitting a second electronic notification message to the requester; and
providing a third user interface that allows the requester or a reviewer to review the further modified template.

10. The method of claim 9 further comprising validating identity of the requester and identify of the at least one designated intellectually oriented service provider.

11. The method of claim 9 further comprising encrypting the template after the template is modified with requester specific content.

12. The method of claim 9, wherein the criteria for the requester to select the at least one designated intellectually oriented service provider comprise jurisdictions or practice areas.

13. The method of claim 9 further comprising providing an additional user interface that allows the requester to input additional request information, and incorporating the additional request information into the virtual content module.

14. The method of claim 13 further comprising generating a non-modifiable cover sheet, wherein the cover sheet contains a summary of the additional request information.

15. The method of claim 13, wherein the additional request information comprises a question from the requester, a preference on fee arrangement of the requester, or a deadline specified by the requester.

16. The method of claim 9 further comprising providing an additional user interface that allows the requester or the reviewer to input an evaluation on the response of the at least one designated intellectually oriented service provider.

17. A system for information management comprising:
a server configured for receiving a request for information from a requester for a service provided by at least one designated intellectually oriented service provider;
means controlled by the server for providing a first user interface that allows the requester to download a preset template, to modify the template with requester specific content, and to select the at least one designated intellectually oriented service provider with a predetermined set of criteria;
means controlled by the server for generating a virtual content module that contains the modified template;
means controlled by the server for transmitting a first electronic notification message to the at least one designated intellectually oriented service provider;
means controlled by the server for providing a second user interface that allows the at least one designated intellectually oriented service provider to update the virtual content module by further modifying the template;
means controlled by the server for transmitting a second electronic notification message to the requester; and
means controlled by the server for providing a third user interface that allows the requester or a reviewer to review the further modified template; wherein:
the server is connected to the Internet.

18. The system of claim 17, wherein the server is connected to the Internet through an Intranet and a firewall, and is accessible to the requester or the reviewer through the Intranet.

19. The system of claim 17 further comprising means controlled by the server for providing an additional user interface that allows the requester to input additional request information, wherein the means for generating the virtual content module is configured to incorporate the additional request information into the virtual content module.

20. The system of claim 19 further comprising means controlled by the server for generating a non-modifiable cover sheet, wherein the cover sheet contains a summary of the additional request information.

* * * * *

UNITED STATES PATENT AND TRADEMARK OFFICE
CERTIFICATE OF CORRECTION

| | | |
|---|---|---|
| PATENT NO. | : 8,832,196 B2 | Page 1 of 1 |
| APPLICATION NO. | : 13/671579 | |
| DATED | : September 9, 2014 | |
| INVENTOR(S) | : Ronald Ker-Wei Yu et al. | |

It is certified that error appears in the above-identified patent and that said Letters Patent is hereby corrected as shown below:

On the title page insert item (30), The foreign priority information of --HK12100988.0 filed on February 3, 2012--.

Signed and Sealed this
Twenty-third Day of December, 2014

Michelle K. Lee
*Deputy Director of the United States Patent and Trademark Office*